(12) United States Patent
Kakui

(10) Patent No.: US 8,098,424 B2
(45) Date of Patent: Jan. 17, 2012

(54) OPTICAL FIBER AMPLIFYING MODULE

(75) Inventor: Motoki Kakui, Yokohama-shi (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 45 days.

(21) Appl. No.: 11/729,971

(22) Filed: Mar. 30, 2007

(65) Prior Publication Data

US 2008/0130101 A1 Jun. 5, 2008

(30) Foreign Application Priority Data

Mar. 31, 2006 (JP) ................. P2006-098914

(51) Int. Cl.
*H04B 10/17* (2006.01)
(52) U.S. Cl. .............. 359/341.1; 359/341.43; 359/341.5
(58) Field of Classification Search .............. 359/341.1, 359/341.5, 341.43
See application file for complete search history.

(56) References Cited

U.S. PATENT DOCUMENTS

| | | | | |
|---|---|---|---|---|
| 5,050,949 | A | * | 9/1991 | DiGiovanni et al. ...... 359/337.4 |
| 5,491,582 | A | * | 2/1996 | Fujita ...................... 359/341.1 |
| 5,521,753 | A | * | 5/1996 | Fake et al. ................ 359/341.32 |
| 5,933,271 | A | * | 8/1999 | Waarts et al. ............ 359/341.31 |
| 6,147,795 | A | | 11/2000 | Derbyshire et al. ......... 359/337 |
| 6,483,632 | B1 | * | 11/2002 | Jolley et al. .............. 359/337.4 |
| 2005/0147370 | A1 | * | 7/2005 | Yusoff et al. ................ 385/125 |
| 2006/0120418 | A1 | * | 6/2006 | Harter et al. ................ 372/30 |
| 2007/0268570 | A1 | * | 11/2007 | Kakui ...................... 359/337.4 |

FOREIGN PATENT DOCUMENTS

| | | |
|---|---|---|
| JP | 06-260709 | 9/1994 |
| JP | 07-226560 | 8/1995 |
| JP | 10-051057 | 2/1998 |
| JP | 10-200182 | 7/1998 |
| JP | 11-243369 | 9/1999 |
| JP | 2000-049406 | 2/2000 |
| JP | 2000-503476 | 3/2000 |
| JP | 2000-114630 | 4/2000 |
| JP | 2000-244417 | 9/2000 |
| JP | 2000-294859 | 10/2000 |
| JP | 2000-513144 | 10/2000 |

(Continued)

OTHER PUBLICATIONS

Teodoro, F.D., et al., "High-power pulsed fiber source at 1567 nm", Proc. Photonic, West 2005.

(Continued)

*Primary Examiner* — Eric Bolda
(74) *Attorney, Agent, or Firm* — McDermott Will & Emery LLP

(57) ABSTRACT

The present invention relates to an optical fiber amplifying module equipped with a structure for stably attaining a high gain even when amplifying light having a low duty cycle. The optical fiber amplifying module comprises at least three amplification optical fibers successively arranged from an input connector to an output collimator. A bandpass filter is arranged between the first- and second-stage amplification optical fibers. Control means having a structure constituted by optically passive components alone or a feedback structure functions so as to render an upper limit to a gain for input light in the first-stage amplification optical fiber, thereby preventing the deterioration in performances such as destruction of the bandpass filter from occurring in optical components positioned on the upstream side of the final-stage amplification optical fiber.

10 Claims, 12 Drawing Sheets

FOREIGN PATENT DOCUMENTS

| | | |
|---|---|---|
| JP | 2001-044557 | 2/2001 |
| JP | 2001-196672 | 7/2001 |
| JP | 2001-313433 | 11/2001 |
| JP | 3306700 | 5/2002 |
| JP | 2003-031879 | 1/2003 |
| JP | 2004-146681 | 5/2004 |

OTHER PUBLICATIONS

Japanese Notice of Reasons for Rejection, w/ English translation thereof, issued in Japanese Patent Application No. 2007-085182 dated Nov. 22, 2011.

* cited by examiner

PUMPING LIGHT
INPUT LIGHT (SIGNAL)
PUMPING LIGHT 43a, 43b₂, 43b₁, 43b, 43

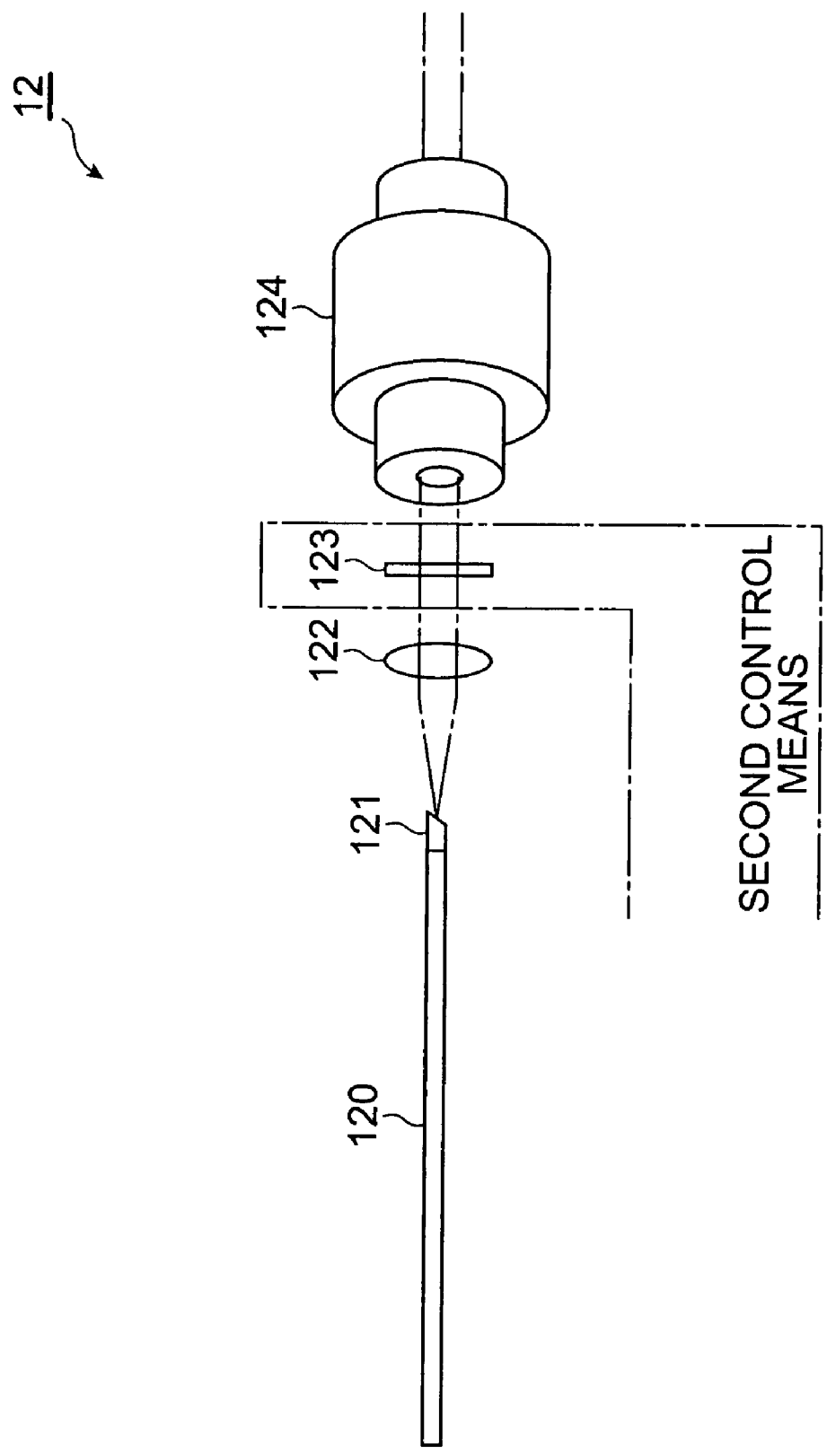

Fig.4

| SAMPLE | UNSATURATED ABSORPTION PEAK (dB/m) | CORE DIAMETER (μm) | CLADDING DIAMETER (μm) | PUMPING POWER (W) | LENGTH (m) |
|---|---|---|---|---|---|
| YbDF41 | 250 | 2.4 | 125 | 0.2 | 3 |
| YbDF42 | 250 | 2.4 | 125 | 1.0 | 9 |
| YbDF43 | 9 | 15.0 | 125 | 17.8 | 4 |

OPTICAL FIBER AMPLIFYING MODULE

BACKGROUND OF THE INVENTION

1. Field of the Invention

The present invention relates to an optical fiber amplifying module which amplifies input light with an amplification optical fiber.

2. Related Background Art

Optical fiber laser light sources have been known as highly-reliable, small-size light sources, and their beam quality is favorable in particular since they have a waveguide structure. Therefore, the optical fiber laser light sources have been widespread in various uses such as processing in electronic/mechanical fields, medicine, measurement, and optical communications.

In particular, optical fiber laser light sources of MOPA (Master Oscillation Power Amplifier) structure in which pulsed seed light outputted from a seed light source is amplified by an optical fiber amplifying module show no pulse width expansion under the influence of the delay in propagation due to the fiber length and the like as compared with currently prevailing light sources of Q-switch structure. Namely, the above-mentioned optical fiber amplifying modules are advantageous in shortening pulses and raising repetition frequencies, and thus are expected to become common in uses of fine processing and measurement. When employed in uses requiring high output such as processing by utilizing a semiconductor laser light source which can be modulated at high speed, it is necessary for optical fiber amplifying modules to have a high gain of 50 dB or more. The high gain is easy to attain in principle, since an amplifying action in the optical fiber amplifying module is usually realized by an amplification optical fiber doped with a rare-earth element or the like.

SUMMARY OF THE INVENTION

The present inventors have examined the above prior art, and as a result, have discovered the following problems.

That is, when the ratio at which the amplified spontaneously emitted light (ASE) component mingles increases in an optical fiber amplifying module so that the extinction ratio of output pulse trains deteriorates, the output of the optical fiber amplifying module is saturated with the ASE light, which makes it harder to attain the high gain. It is therefore desirable that a dielectric multilayer film bandpass filter be arranged on a path for propagating light to be amplified, so as to select only the light to be amplified. In uses for laser processing and the like, pulse peaks are higher than those in uses with lower signal light levels such as optical communications, whereby the possibility of destructing the dielectric multilayer film is higher. For example, F. D. Teodoro, et al., "High-power pulsed fiber source at 1567 nm", Proc. Photonic WEST2005 (Document 1) proposes a system combining an optical fiber Bragg grating with an optical circulator, and the like.

As disclosed in Japanese Patent Publication No. 3306700 (Document 2), the gain or optical power level up to the upstream part of an optical filter in an optical fiber amplifying module may be controlled constantly so as to prevent the optical filter from being destroyed. When lasers for processing and the like have a very low duty cycle, e.g., $1/100$ to $1/10000$, however, pulse peaks are hard to detect, whereby active control such as the one disclosed in Patent Document 1 may yield a high risk of malfunction because of restrictions on time constant and the like.

On the other hand, amplification optical fibers may yield an excessively high gain depending on operating states, thereby causing mode-competed oscillations by themselves. In this case, outputs such as optical surges may destroy optical components constituting the optical fiber amplifying module. In particular, there are many cases where pumping light and light to be amplified are not separated from each other in the cladding pumping scheme widely used for attaining a high output. In this case, there is a risk of optical surges caused by the light to be amplified that should propagate through a core and ASE light being coupled to a propagation mode of an inner cladding through which the pumping light propagates, whereby pumping light sources may be destroyed. Therefore, it is desirable that the gain of cladding-pumped parts be not too high. In general, a target for the upper limit has been said to be about 20 dB.

The present invention has been developed to eliminate the problems described above. It is an object of the present invention to provide an optical fiber amplifying module equipped with a structure for stably attaining a high gain even when amplifying light having a low duty cycle.

An optical fiber amplifying module according to the present invention comprises, at least, an input end for inputting light having a duty cycle of 1% or less, an output end for outputting amplified light obtained by amplifying the input light acquired through the input end, a plurality of amplification optical fibers (at least three amplification optical fibers), an optical filter, and first control means for regulating an amplification gain so as to prevent the optical filter from being destroyed and so forth. Here, the duty cycle is defined by "pulse width/pulse period".

The plurality of amplification optical fibers are cascaded along a light propagation path extending from the input end to the output end, while each of them amplifies the input light. The optical filter is an optical component for selectively transmitting therethrough the input light acquired through the input end. The optical filter is arranged between the first-stage amplification optical fiber through which the input light transmitted via the input end is initially transmitted and the second-stage amplification optical fiber through which the amplified light outputted from the first-stage amplification optical fiber is initially transmitted, of the plurality of amplification optical fibers. In particular, the first control means sets a gain for the input light in the first-stage amplification optical fiber to a first predetermined value or lower.

In the optical fiber amplifying module according to the present invention, the first control means may be constructed by optically passive components alone or have a feedback structure. For example, in the state where the unsaturated absorption of the first-stage amplification optical fiber is optimized to a specific value in a temperature-controlled environment, the first control means controls the pumping light source supplying the pumping light to the first-stage amplification optical fiber such that the pumping light keeps a constant power. Here, it will be preferred if the environmental temperature in the surroundings of the amplification optical fiber is controlled so as to fall within a specific range. Though such temperature adjustment may be carried out in a scheme which performs feedback control with respect to a Peltier device while detecting the temperature with a thermistor, a scheme which mounts an amplification optical fiber on a material having such a favorable thermal conductivity as to be able to act substantially as a heatsink and forcibly cools the heatsink with a fan and the like may also be used. In the structure suppressing the gain of the first-stage amplification optical fiber by controlling the unsaturated absorption of the first-stage amplification optical fiber and its pumping light power as such, the first control means can also be realized by setting the unsaturated absorption and pumping light power to their respective optimal values beforehand.

In the optical fiber amplifying module according to the present invention, the first control means can be realized by a feedback structure. In this case, the first control means is equipped with a structure for monitoring a wavelength component other than the input light in the ASE light outputted from the first-stage amplification optical fiber and controlling according to the monitored value the power of pumping light supplied to the first-stage amplification optical fiber. The first control means may include two reflecting means, respectively arranged at light entrance and exit ends of the first-stage amplification optical fibers, for transmitting the input light therethrough and selectively reflecting a specific wavelength component near an input light wavelength. The predetermined value may be either a specific value or a numerical range. The first control means may perform control either constantly or only when the predetermined value is exceeded.

The optical fiber amplification module according to the present invention may further comprise second control means for setting a gain for the input light in the final-stage amplification optical fiber arranged closest to the output end in the plurality of amplification optical fibers to a second predetermined value or less. The second predetermined value is set to about 20 dB as mentioned above in general and is usually smaller than the first predetermined value. Specifically, the second control means can be realized by two reflecting means, arranged so as to hold the final-stage amplification optical fiber therebetween, for selectively reflecting a specific wavelength component different from the input light. In this case, the reflecting means positioned on the downstream side as seen in the propagating direction of input light in the two reflecting means is arranged in a space where the amplified light outputted from the final-stage amplification optical fiber propagates between the final-stage amplification optical fiber and the output end. Preferably, the specific wavelength component selectively reflected is a wavelength shorter than any of wavelength components included in the input light (light to be amplified).

Furthermore, an optical fiber amplifying module according to the present invention comprises an input end for inputting light having a duty cycle of 1% or less, an output end for outputting amplified light obtained by amplifying the input light acquired through the input end, a plurality of amplification optical fibers (at least three amplification optical fibers) each doped with ytterbium (Yb), and an optical filter. In this case, the plurality of amplification optical fibers are cascaded along a light propagation path extending from the input end to the output end. For selectively transmitting the input light acquired through the input end, the optical filter is arranged between the first-stage amplification optical fiber through which the input light transmitted through the input end is initially transmitted and the second-stage amplification optical fiber through which the amplified light outputted from the first-stage amplification optical fiber is initially transmitted in the plurality of amplification optical fibers. In particular, it will be preferred if the first-stage amplification optical fiber in the optical fiber amplifying module equipped with such a structure has an unsaturated absorption of 1000 dB or less for the light propagating through the first-stage amplification optical fiber.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2A is a view showing a cross-sectional structure of the final-stage amplification optical fiber (YbDF 43) in the optical fiber amplifying module according to the first embodiment, whereas

FIG. 3 is a view for explaining the structure of the output collimator included in the optical fiber amplifying module according to the first embodiment;

FIG. 4 is a table listing various properties of the amplification optical fibers (YbDF 41 to 43) included in the optical fiber amplifying module according to the first embodiment;

FIG. 9A shows gain spectra of the first-stage amplification optical fiber (YbDF 41), whereas

DETAILED DESCRIPTION OF THE PREFERRED EMBODIMENTS

In the following, embodiments of the optical fiber amplifying module according to the present invention will be explained in detail with reference to FIGS. 1, 2A, 2B, 3 to 8, 9A, 9B, and 10 to 12. In the explanation of the drawings, the same constituents and the same parts will be referred to with the same numerals without repeating their overlapping descriptions.

First Embodiment

Figure 1:
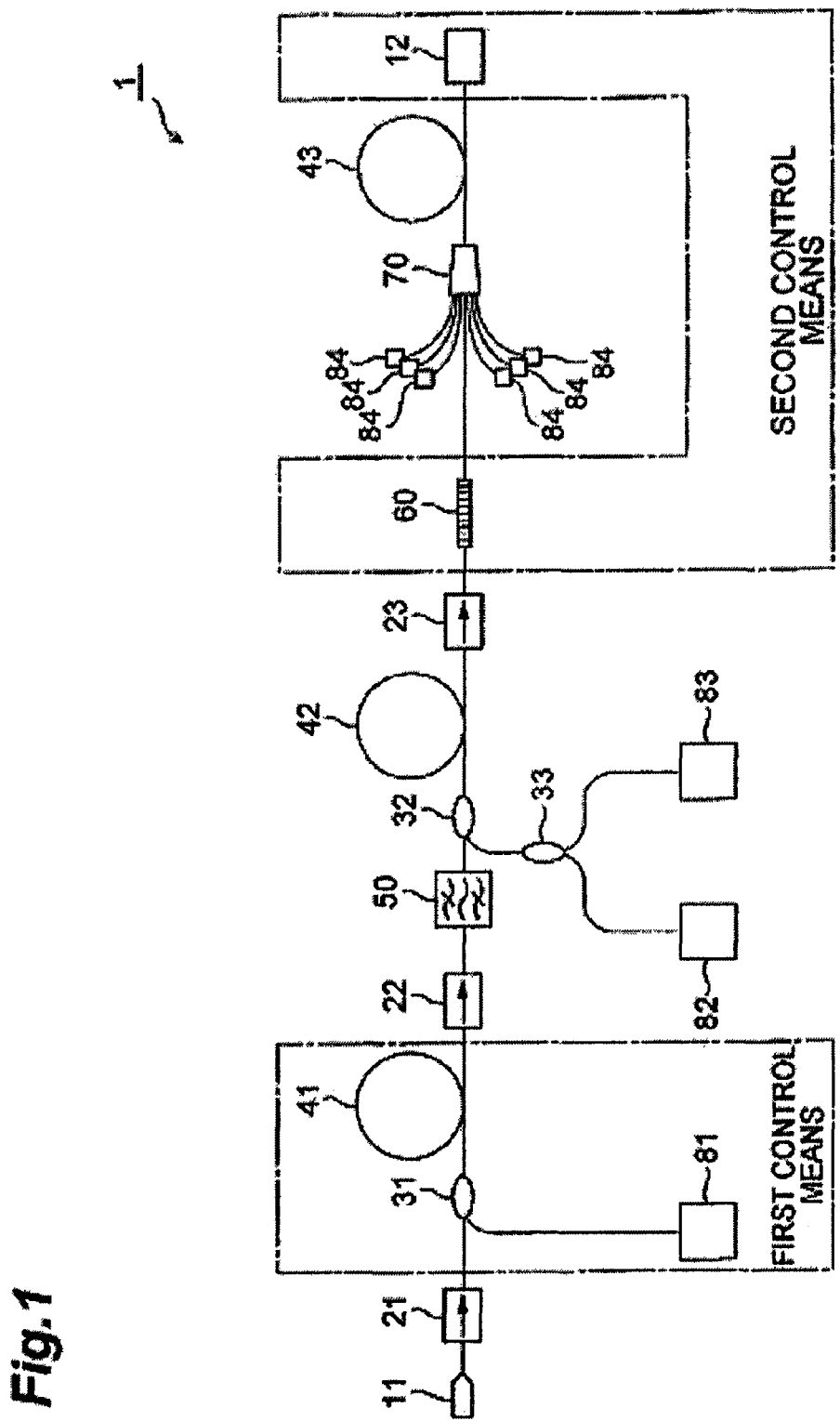
FIG. 1 is a diagram showing the structure of a first embodiment of the optical fiber amplifying module according to the present invention.

FIG. 1 is a diagram showing the structure of a first embodiment of the optical fiber amplifying module according to the present invention. The optical fiber amplifying module 1 according to the first embodiment shown in FIG. 1 inputs light fed to an input connector 11 and outputs thus amplified light as collimated light from an output collimator 12. The optical fiber amplifying module 1 comprises an optical isolator 21, an optical coupler 31, a YbDF 41, an optical isolator 22, a bandpass filter 50, an optical coupler 32, a YbDF 42, an optical isolator 23, an optical fiber Bragg grating 60, a combiner 70, and a YbDF 43 which are successively arranged from the input connector 11 to the output collimator 12. The optical fiber amplifying module 1 further comprises a pumping light source 81 connected to the optical coupler 31, a polarization beam combiner 33 connected to the optical coupler 32, pumping light sources 82, 83, and a plurality of pumping light sources 84 connected to the combiner 70.

Figure 2A:
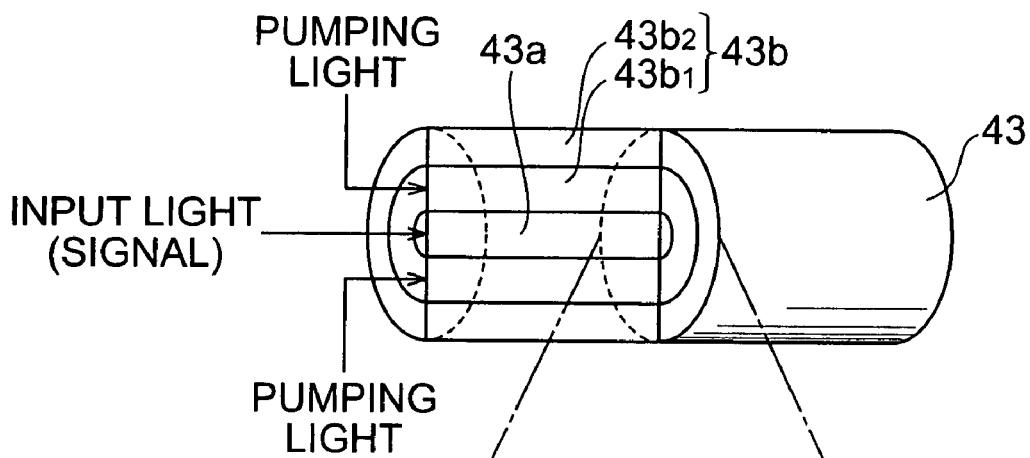
Figure 2B:
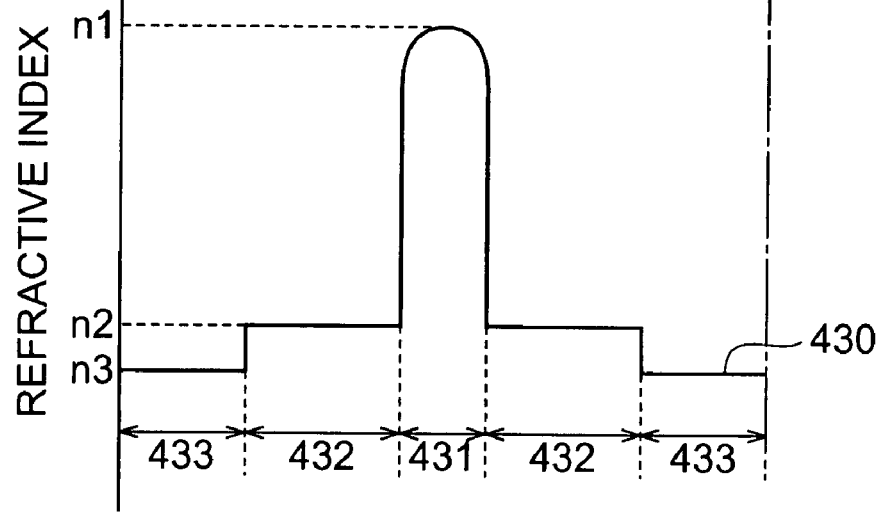
FIG. 2B is a refractive index profile thereof.

Each of the YbDFs 41 to 43 is an amplification optical fiber (Yb-Doped Fiber) employing silica glass as its host glass whose optical waveguide region is doped with elementary Yb as an optically active material. In particular, as shown in FIG. 2A, the YbDF 43 provided in the final stage comprises a core 43a (having a maximum refractive index n1) which is doped with elementary Yb and propagates light to be amplified, and a cladding region 43b surrounding the core 43a. The cladding region 43b is constituted by an inner cladding 43b1 (having a refractive index n2 (<n1)) and an outer cladding 43b2 (having a refractive index n3 (<n2)) surrounding the inner cladding 43b1. FIG. 2B shows a refractive index profile 430 of the YbDF 43. In the refractive index profile 430, areas 431, 432, and 433 indicate refractive indexes of parts along the diagonal direction of the core 43a, inner cladding 43b1, and outer cladding 43b2, respectively.

In the first embodiment, the gain in the first-stage YbDF 41 is controlled so as to become a first predetermined value or lower by a first control means constructed by passive optical components alone. Namely, the first control means in the first embodiment is realized by setting the unsaturated absorption of the first-stage YbDF 41 and the power of pumping light outputted from the pumping light source 81 to respective predetermined optimal values beforehand. On the other hand, the gain in the final-stage YbDF 43 is controlled by a second control means so as to become a predetermined second predetermined value or lower. The second control means is realized by reflecting means arranged at both ends of the final-stage YbDF 43. The second predetermined value is set to about 20 dB as mentioned above in general and is usually smaller than the first predetermined value.

The pumping light source 81 is a single-mode pumping LD which outputs pumping light (in the wavelength band of 975 nm in the power class of 300 mW) to be supplied to the YbDF 41. Each of the pumping light sources 82, 83 is a single-mode pumping LD which outputs pumping light (in the wavelength band of 975 nm in the power class of 500 mW) to be supplied to the YbDF 42. The plurality of pumping light sources 84 are multimode pumping LDs which output pumping light (in the wavelength band of 915 nm) to be supplied to the YbDF 43. Each of the YbDFs 41 to 43 can amplify light in the wavelength band of 1064 nm.

Each of the optical isolators 21 to 23 transmits light therethrough in a forward direction from the input connector 11 to the output collimator 12 but not backward. The optical coupler 31 outputs pumping light arriving from the pumping light source 81 to the YbDF 41, and the input light (light to be amplified) arriving from the optical isolator 21 to the YbDF 41. The polarization beam combiner 33 combines, in terms of polarization, the pumping light beams outputted from the pumping light sources 82, 83. Further, the polarization beam combiner 33 outputs thus combined pumping light to the optical coupler 32. The optical coupler 32 outputs the pumping light arriving from the polarization beam combiner 33 to the YbDF 42, and the light to be amplified arriving from the optical filter (bandpass filter) 50 to the YbDF 42. The combiner 70 outputs the light to be amplified arriving from the optical fiber Bragg grating 60 to the YbDF 43, and the pumping light arriving from the plurality of pumping light sources 84 to the YbDF 43.

The bandpass filter 50 is arranged between the first-stage YbDF 41 and second-stage YbDF 42, more specifically between the optical isolator 22 and optical coupler 32. The bandpass filter 50 selectively transmits therethrough the light to be amplified in the light arriving from the optical isolator 22 and blocks the other wavelength components. The bandpass filter 50 includes a dielectric multilayer film, for example. The optical fiber Bragg grating 60, which is arranged between the optical isolator 23 and combiner 70, selectively reflects a specific wavelength component different from the light to be amplified and transmits the other wavelength components therethrough.

FIG. 3 is a view for explaining the structure of the output collimator 12 included in the optical fiber amplifying module 1 according to the first embodiment. In FIG. 3, a plurality of components constituting the output collimator 12 are shown in a disassembled state. The output collimator 12 includes an optical fiber 120, an end cap 121, a lens 122, a reflective film 123, and an optical isolator 124. In the first embodiment, the above-mentioned second control means is constituted by the optical fiber Bragg grating 60 and reflective film 123.

One end of the optical fiber 120 is optically connected to the final-stage YbDF 43, whereas the other end of the optical fiber 120 is provided with the end cap 121. The lens 122 collimates the light outputted from the end cap 121. The reflective film 123 inputs the light outputted after being collimated by the lens 122 and reflects the same wavelength component as the specific reflection wavelength of the optical fiber Bragg grating 60, while transmitting the other wavelength components therethrough. The reflective film 123 is constituted by a dielectric multilayer film, for example. The optical isolator 124 transmits the light arriving from the reflective film 123 to the outside, but not backward.

The optical fiber Bragg grating 60 and reflective film 123 provided at both ends of the final-stage YbDF 43 are optical components which selectively reflect a specific wavelength component different from the light to be amplified but transmit the other wavelength components therethrough. An optical resonator constituted by the optical fiber Bragg grating 60 and reflective film 123 controls the gain in the YbDF 43 such that it becomes a predetermined value or lower. Namely, the second control means in the first embodiment is constructed by the optical fiber Bragg grating 60 and reflective film 123. The reflective film 123 positioned on the downstream side is provided in a space after the light to be amplified outputted from the YbDF 43 is outputted from the end cap 121. Preferably, the specific wavelength component reflected by the optical fiber Bragg grating 60 and reflective film 123 is shorter than the wavelength of light to be amplified.

The optical fiber amplifying module 1 operates as follows. The pumping light (in the wavelength band of 975 nm) outputted from the pumping light source 81 is supplied forward to the YbDF 41 through the optical coupler 31. The pumping light beams (in the wavelength band of 975 nm) outputted from the pumping light sources 82, 83 are combined by the polarization beam combiner 33, in terms of polarization. Thus polarization-combined pumping light is supplied forward to the YbDF 42 through the optical coupler 32. The pumping light beams (in the wavelength band of 915 nm) outputted from the plurality of pumping light sources 84 are supplied forward to the YbDF 43 through the combiner 70.

The light to be amplified (at a wavelength of 1064 nm) fed to the input connector 11 is inputted to the YbDF 41 through the optical isolator 21 and optical coupler 31, and is amplified in the YbDF 41. The light amplified in the YbDF 41 is fed to the YbDF 42 through the optical isolator 22, bandpass filter 50, and optical coupler 32, and is also amplified in the YbDF 42. The light amplified in the YbDF 42 is fed to the YbDF 43 through the optical isolator 23, optical fiber Bragg grating 60, and combiner 70, and is further amplified in the YbDF 43.

The light amplified in the YbDF 43 is finally collimated by the output collimator 12, so as to be outputted to the outside of the optical fiber amplifying module 1. In the output collimator 12, the light fed from the YbDF 43 is outputted to the space through the optical fiber 120 and end cap 121. This output light is collimated by the lens 122, and thus collimated light is thereafter outputted to the outside of the optical fiber amplifying module 1 through the reflective film 123 and optical isolator 124.

Namely, in the optical fiber amplifying module 1, the light to be amplified inputted through the input connector 11 is amplified by the YbDFs 41 to 43, and thus amplified light is outputted as collimated light from the output collimator 12 to the outside of the optical fiber amplifying module 1. For example, a pulse-modulated YAG laser, LD, or the like is coupled as a seed light source to the input connector 11, whereas the light outputted from the output collimator 12 is used for processing or measurement.

FIG. 4 is a table listing various properties of the above-mentioned YbDFs 41 to 43 as samples of amplification optical fibers included in the optical fiber amplifying module 1 according to the first embodiment. The YbDF 41 has an unsaturated absorption peak of 250 dB/m, a core diameter of 2.4 µm, and a cladding diameter of 125 µm. The YbDF 42 has an unsaturated absorption peak of 180 dB/m, a core diameter of 4.0 µm, and a cladding diameter of 125 µm. The YbDF 43 has a double cladding structure with an unsaturated absorption peak of 9 dB/m, a core diameter of 15.0 µm, and a cladding diameter (inner cladding diameter) of 125 µm. Only the YbDF 43 has a low unsaturated absorption peak, since it assumes cladding pumping instead of core pumping. The cladding diameter in the YbDF 43 indicates the inner cladding diameter. In the YbDF 43, a coating (outer cladding 43b2) having a lower refractive index is provided on the outside of the inner cladding 43b1, so as to enable cladding pumping. The full width at half maximum of the bandpass filter 50 is 3 nm.

When an LD which is inexpensive while being capable of the fastest modulation is employed as a seed light source, a current which can be modulated at a high speed is about 100 mA. As a result, pulse peaks outputted from the LD are typically 20 to 30 mW at the highest.

In processing lasers, their pulse width is 10 ns to 100 ns, whereas their repetition frequency is mostly set within the range of 10 kHz to 100 kHz. When the pulse width is 10 nm while the repetition frequency is 10 kHz, for example, the duty cycle is the lowest ($1/10000$). When the pulse width is 100 nm while the repetition frequency is 100 kHz, the duty cycle is the highest ($1/100$). The duty cycle is defined by "pulse width/pulse period". When the peak value of a seed light source is 30 mW, the average optical power of seed light outputted from the seed light source ideally changes within the range from -25 dBm to -5 dBm.

Figure 5:
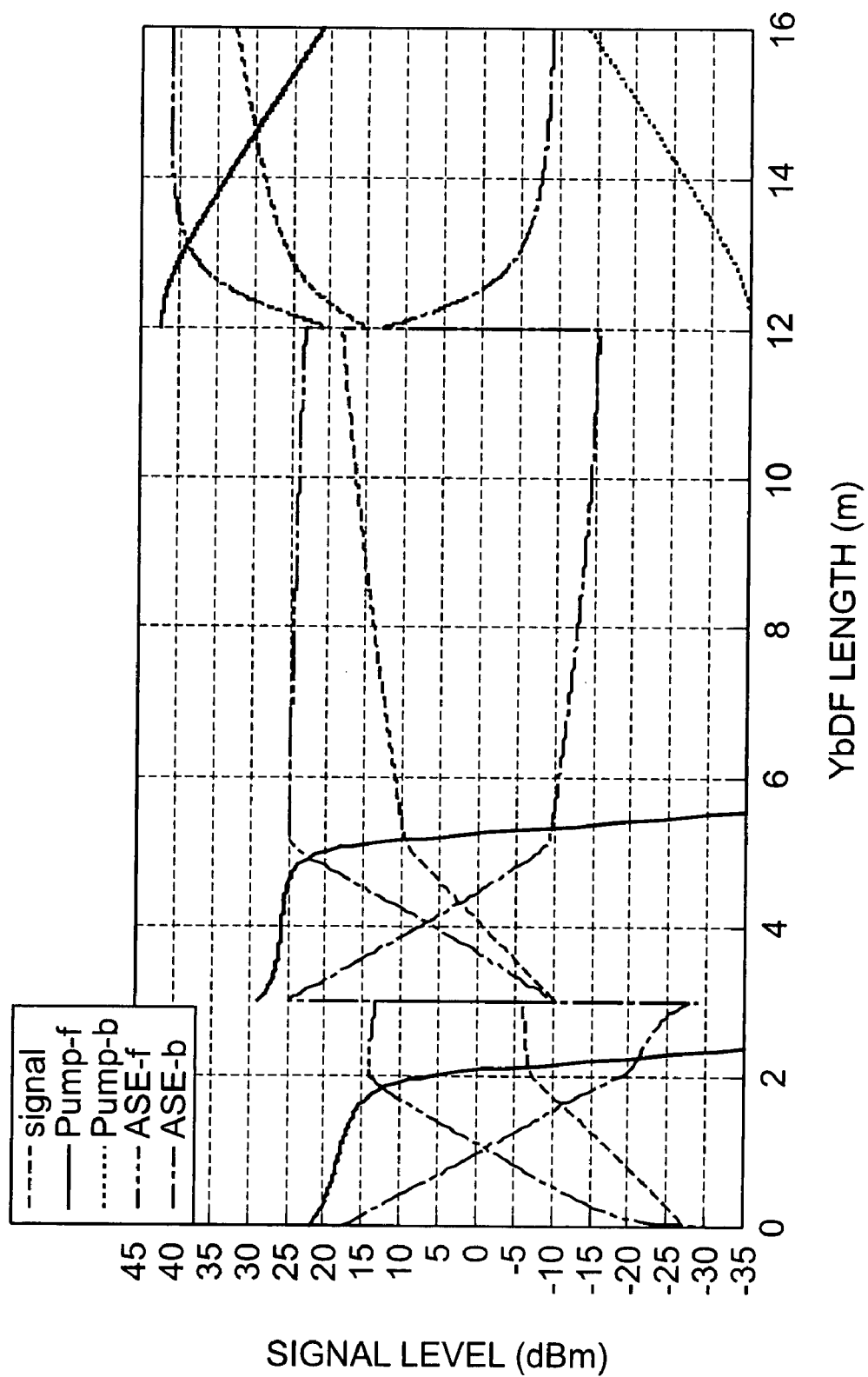
FIG. 5 is a graph showing longitudinal distributions of optical level in the optical fiber amplifying module according to the first embodiment.
Figure 6:
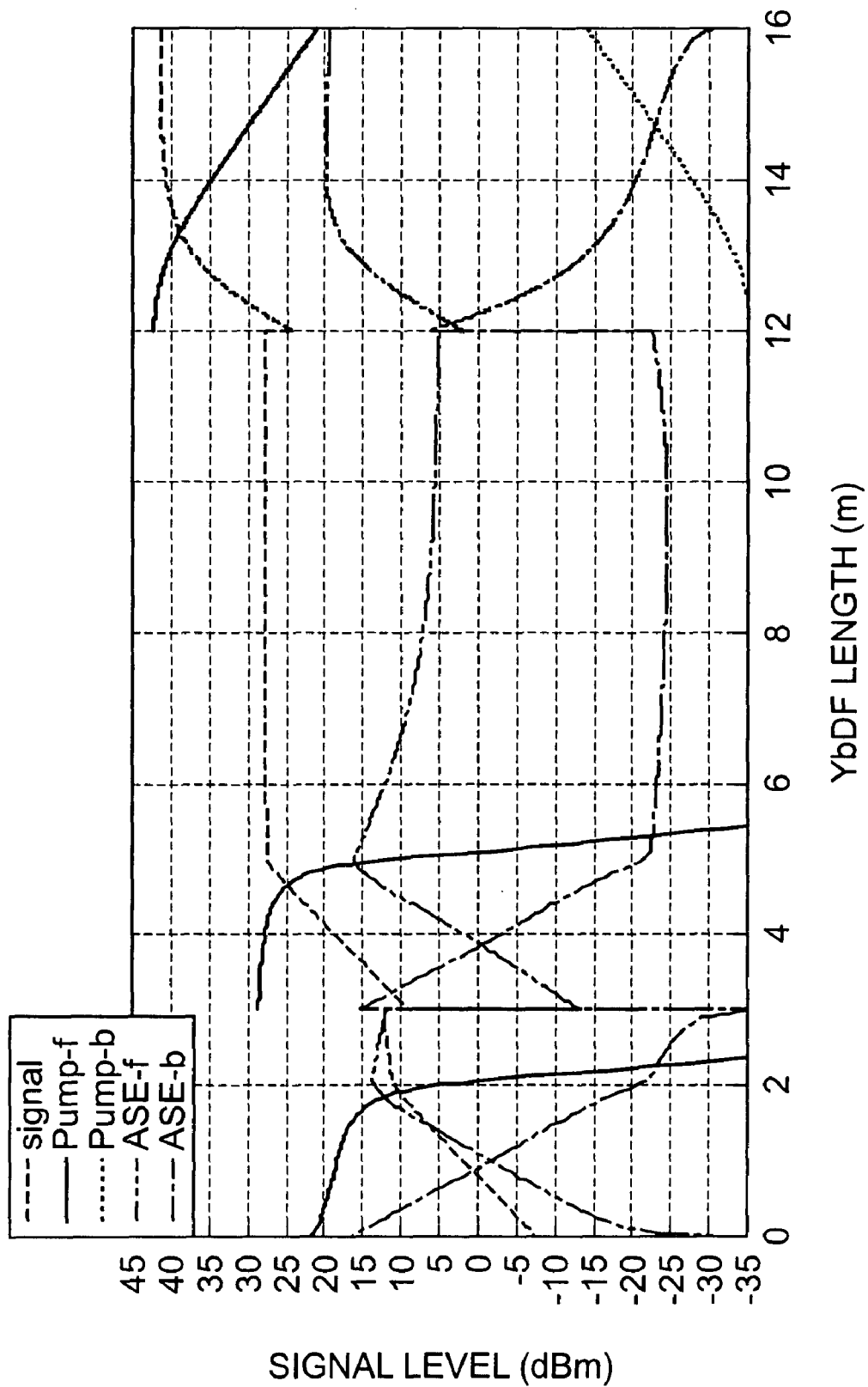
FIG. 6 is a graph showing longitudinal distributions of optical level in the optical fiber amplifying module according to the first embodiment.
Figure 7:
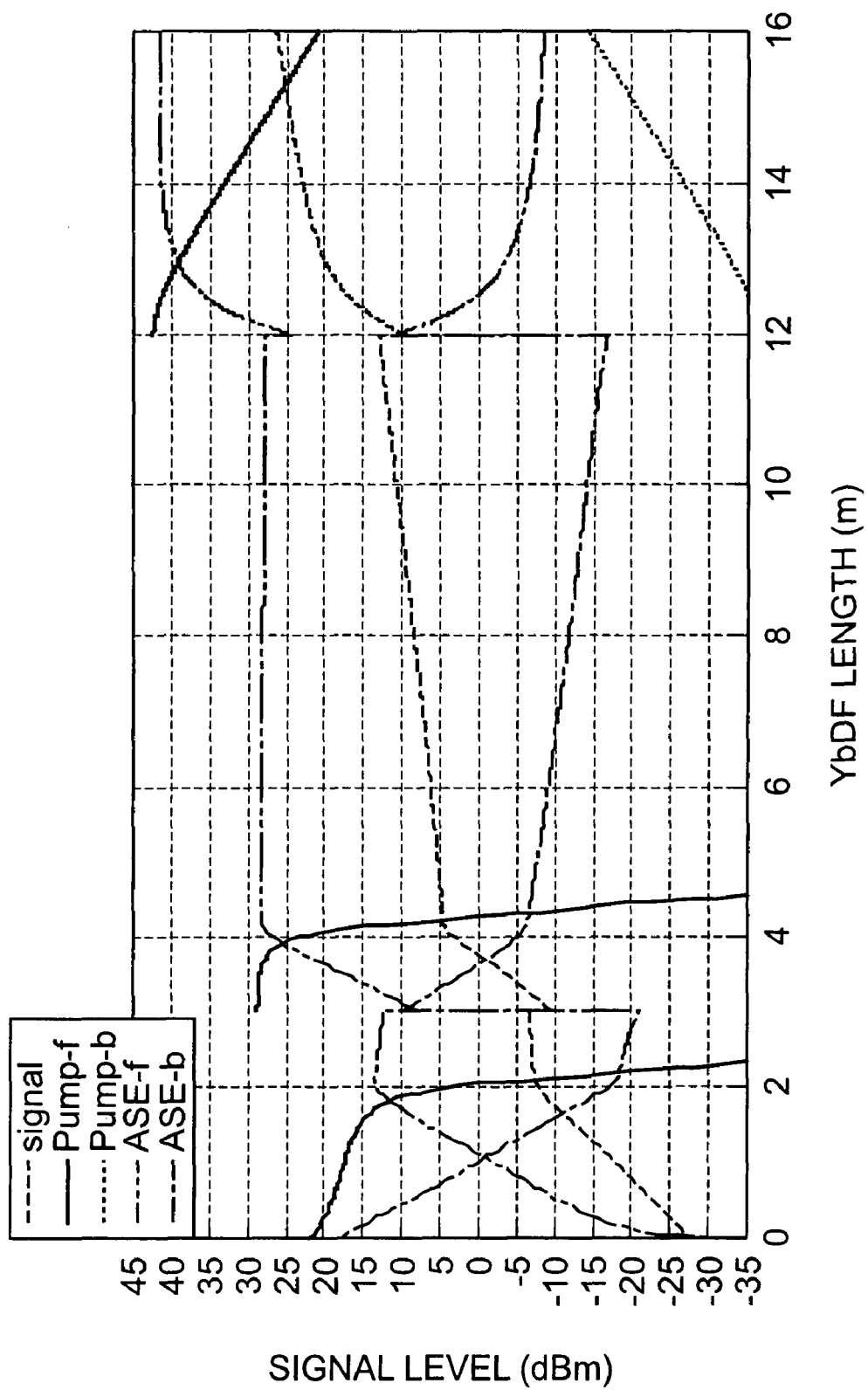
FIG. 7 is a graph showing longitudinal distributions of optical level in the optical fiber amplifying module according to a comparative example.

Each of FIGS. 5 and 6 is a graph showing longitudinal distributions of optical level in the optical fiber amplifying module according to the first embodiment. FIG. 7 is a graph showing longitudinal distributions of optical level in the optical fiber amplifying module according to a comparative example. The structure of the optical fiber amplifying module according to the comparative example differs from that of the optical fiber amplifying module 1 according to the first embodiment in that it lacks the bandpass filter 50. Each of FIGS. 5 to 7 shows a level distribution of light to be amplified (signal), a level distribution of forward pumping light (Pump-f), a level distribution of backward pumping light (Pump-b), a level distribution of forward ASE light (ASE-f), and a level distribution of backward ASE light (ASE-b). Each of FIGS. 5 and 7 shows the case where the average optical power of light to be amplified which is inputted through the input connector 11 is -25 dBm. FIG. 6 shows the case where the average optical power of light to be amplified which is inputted to the input connector 11 is -5 dBm.

When the average optical power of light to be amplified which is inputted through the input connector 11 is -25 dBm in the optical fiber amplifying module 1 according to the first embodiment as shown in FIG. 5, the average optical power of light outputted from the output collimator 12 is 2 W, and the duty cycle is $1/10000$. Therefore, the output pulse peak value in this case becomes 20 kW. When the average optical power of light to be amplified which is inputted through the input connector 11 is -5 dBm in the optical fiber amplifying module 1 according to the first embodiment as shown in FIG. 6, on the other hand, the average optical power of light outputted from the output collimator 12 exceeds 10 W, and the duty cycle is $1/100$. Therefore, the output pulse peak value in this case becomes 1 kW. In each case, the pulse energy exceeds 0.1 mJ, whereby processing such as marking can be performed.

When the average optical power of light to be amplified which is inputted through the input connector 11 is -25 dBm in the optical fiber amplifying module according to the comparative example lacking the bandpass filter 50 as shown in FIG. 7, by contrast, the average optical power of light outputted from the output collimator 12 lowers by 7 dB. Namely, the pulse peak power does not exceed 4 kW, so that the pulse energy becomes 0.04 mJ, which extremely limits uses.

In general, however, the bandpass filter is constructed by a dielectric multilayer film and is very likely to be destroyed when pulsed light with a high peak power is fed thereto. The maximum input power tolerance of a commercially available bandpass filter is about 0.5 to 1 W. Therefore, it is desirable that the gain from the input connector 11 to the exit of the optical isolator 22 be always about 15 dB (=1 W/30 mW).

For this purpose, automatic gain control (AGC) may be performed for the first-stage YbDF 41 as described in the above-mentioned Document 2. When a low duty cycle is assumed, however, it is difficult for the peak power to be detected alone, while the time constant for feedback control to a control circuit and the like become problems, whereby the AGC is hard to employ. As measures against it, the pumping power, Yb concentration, and length for the YbDF 41, and the wavelength of light to be amplified when appropriate, may be optimized so as to attain a small signal gain state in the whole range of average optical power of inputted light to be amplified (-25 dBm to -5 dBm). Specifically, it is desirable that the unsaturated absorption-length peak of the YbDF 41 be 1000 dB or less.

Figure 8:
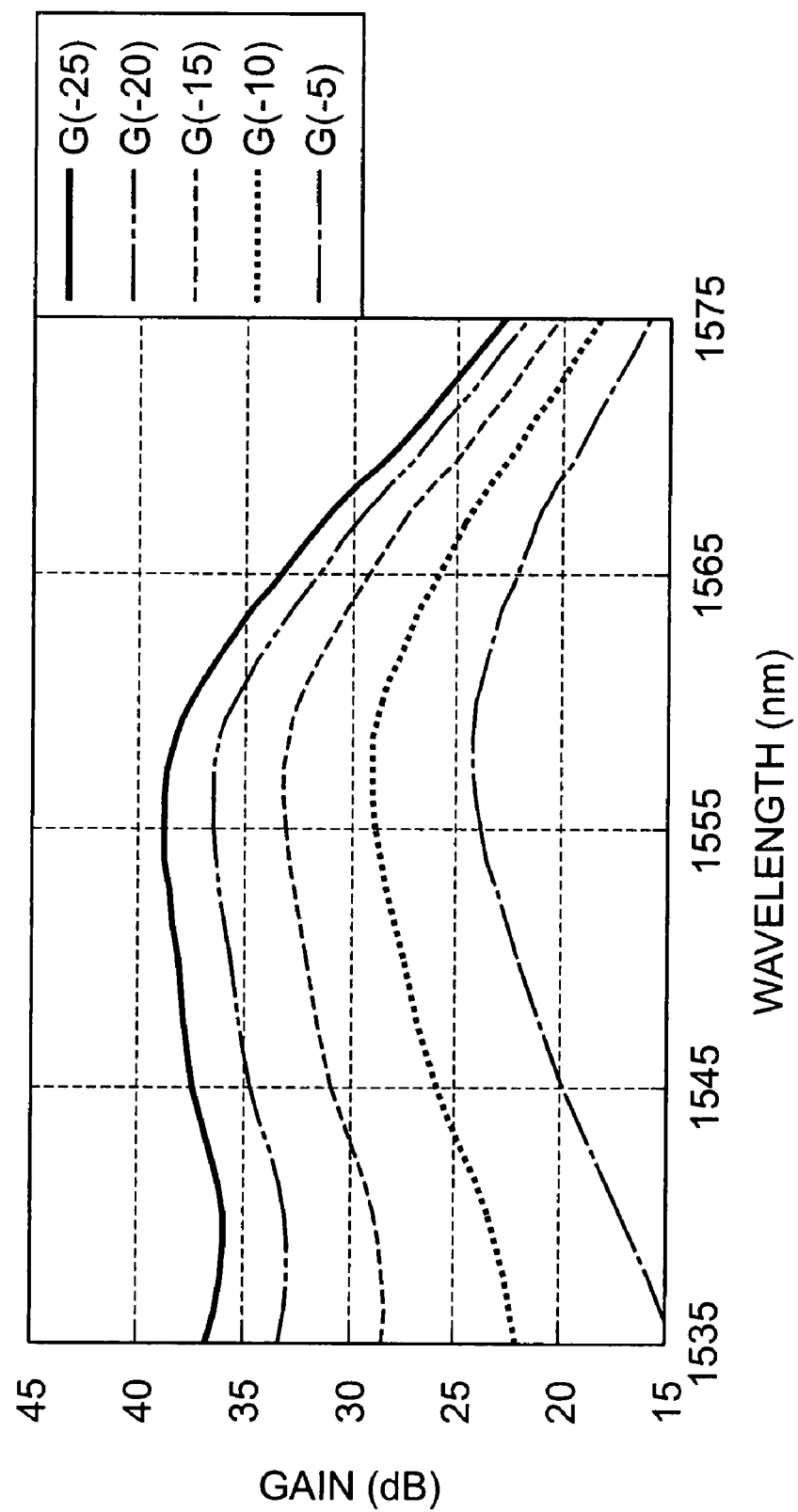
FIG. 8 shows gain spectra of EDF.

In the case of an amplification optical fiber whose optical waveguide region is doped with elementary Er as an optically active material (EDF: Erbium-Doped Fiber), the pumping life is long, i.e., 10 ms. Therefore, as shown in FIG. 8, the gain begins to be saturated when the power of the inputted light to be amplified reaches 5 dBm, whereby the gain in the dynamic range of -25 dBm to -5 dBm fluctuates greatly even at the wavelength of 1567 nm stated in the above-mentioned Document 1. In the case of YbDF, by contrast, the pumping life is short, i.e., about 1 ms, so that a small signal gain state can be maintained even when the power of inputted light to be amplified reaches −5 dBm. FIG. 8 shows gain spectra of EDF. FIG. 8 represents a gain spectrum (G(−25)) where the input level is −25 dB, a gain spectrum (G(−20)) where the input level is −20 dB, a gain spectrum (G(−15)) where the input level is −15 dB, a gain spectrum (G(−10)) where the input level is −10 dB, and a gain spectrum (G(−5)) where the input level is −5 dB.

Figure 9A:
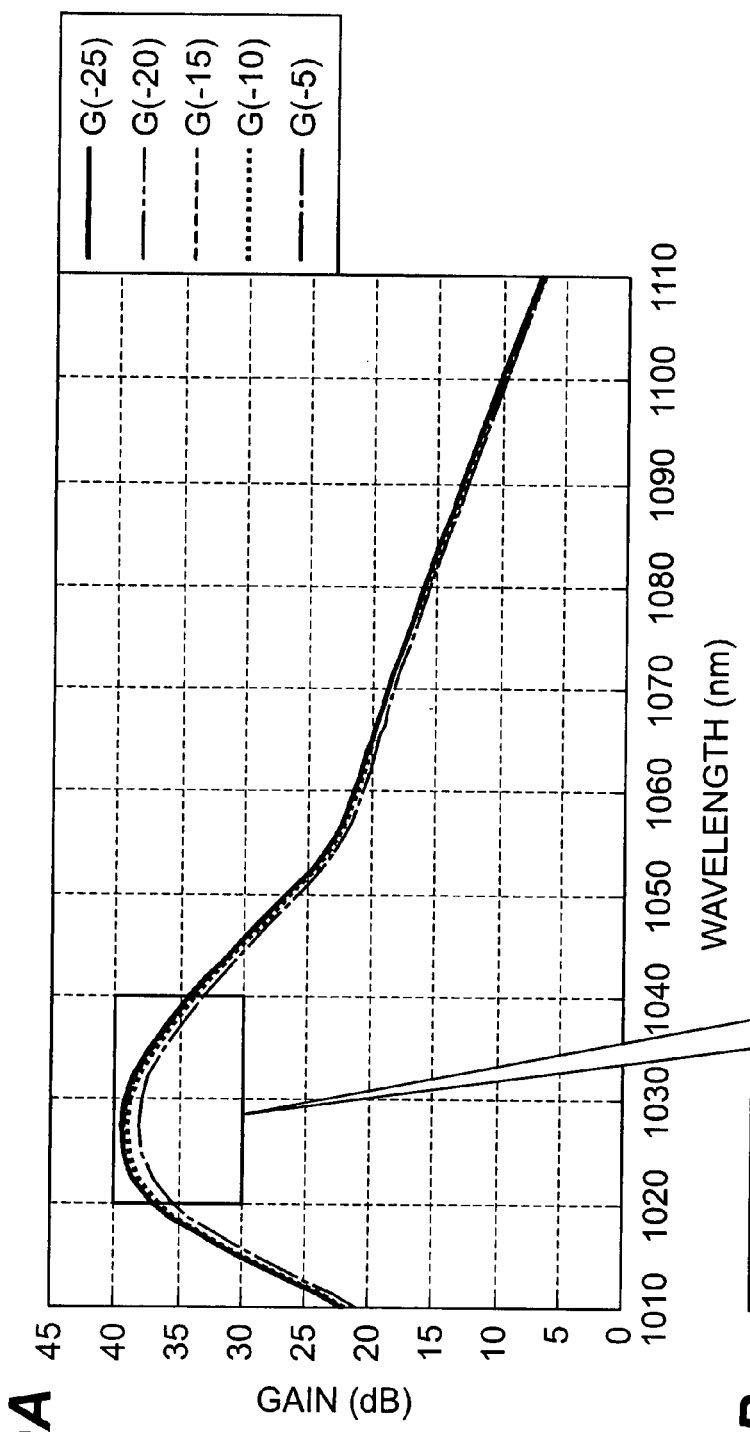
Figure 9B:
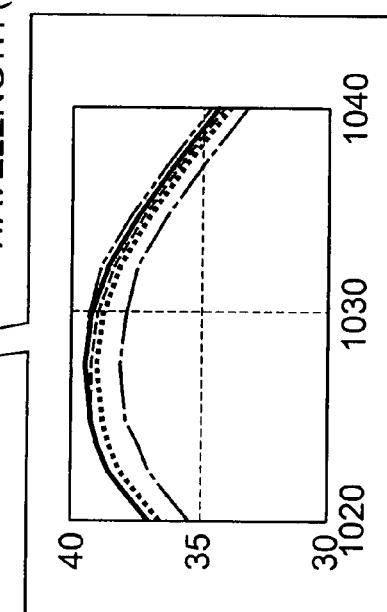
FIG. 9B is an enlarged view of a partial region thereof.

FIG. 9A shows gain spectra of the first-stage YbDF 41, whereas FIG. 9B is an enlarged view of a partial region thereof. The gain at a wavelength of 1064 nm is 20 dB. The path from the input connector 11 to the optical isolator 22 includes two optical isolators and at least four fused connection points. Taking account of the fact that the spec for optical isolator insertion loss in the wavelength band of 1064 nm is 2 dB/piece while the fusion loss is about 0.2 dB to 0.4 dB per site, the gain is seen to be maintained at about 15 dB in this path when the average optical power of inputted light to be amplified falls within the range of −25 dBm to −5 dBm. Each of FIGS. 9A and 9B shows a gain spectrum (G(−25)) where the input level is −25 dB, a gain spectrum (G(−20)) where the input level is −20 dB, a gain spectrum (G(−15)) where the input level is −15 dB, a gain spectrum (G(−10)) where the input level is −10 dB, and a gain spectrum (G(−5)) where the input level is −5 dB.

Preferably, the bandpass filter 50 is inserted only immediately downstream the first-stage YbDF 41. This is because that there is a restriction due to the maximum input power of the bandpass filter 50 and that it is rather advantageous for stabilizing the gain of the cladding-pumped final-stage YbDF 43. The latter reason is exemplified by FIG. 10.

Figure 10:
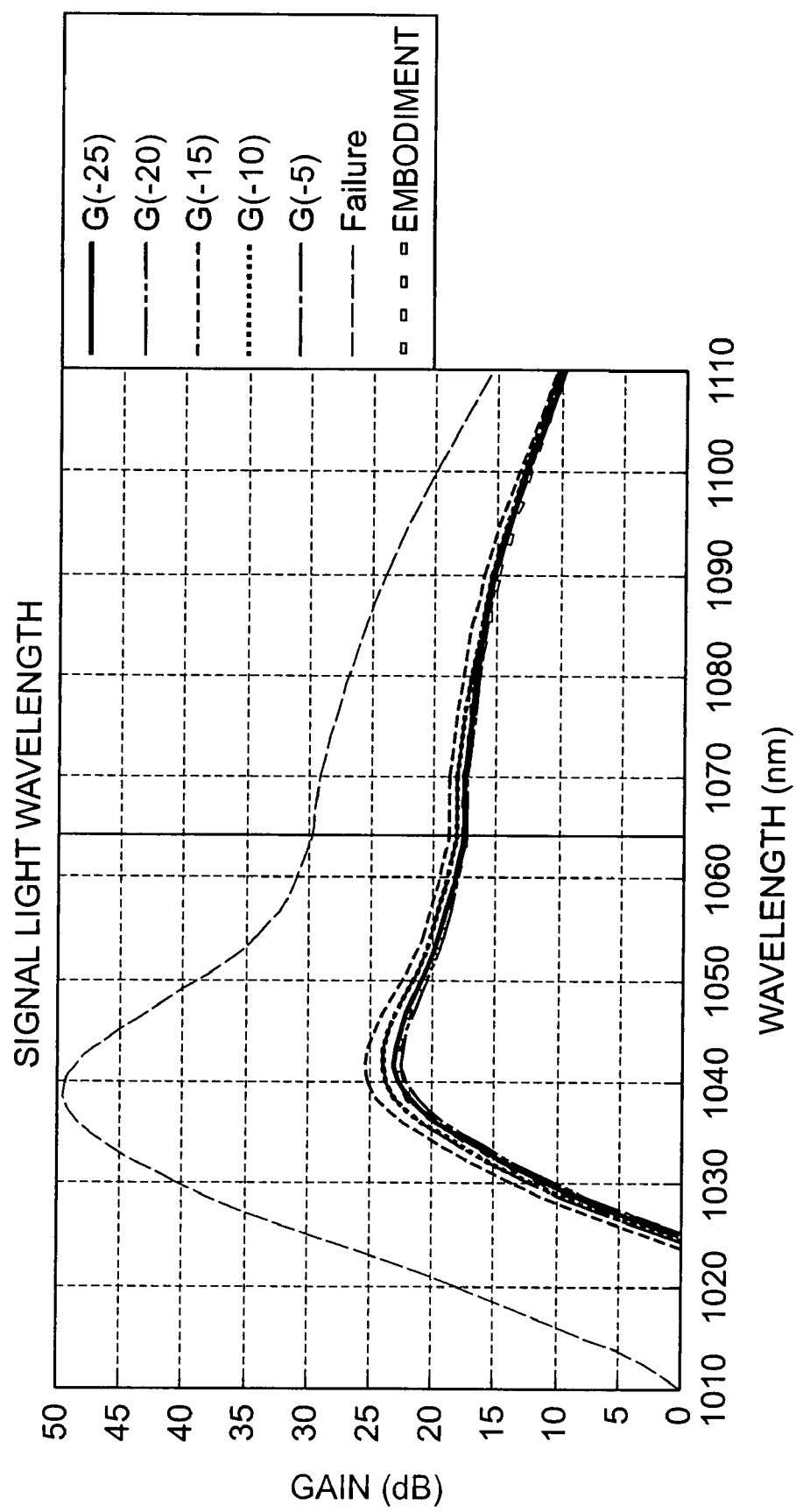
FIG. 10 shows gain spectra of the final-stage amplification optical fiber (YbDF 43)

FIG. 10 shows gain spectra of the final-stage YbDF 43. Since the bandpass filter 50 is provided only between the first-stage YbDF 41 and second-stage YbDF 42, the ASE light generated in the second-stage YbDF 42 is injected into the final-stage YbDF 43. As a result, the power of light to be amplified outputted from the second-stage YbDF 42 is lower than 20 dBm when the average power of the inputted light to be amplified is −25 dBm as shown in FIGS. 5 and 6. Since the power of forward ASE light is near 25 dBm, on the other hand, the average input power seen from the YbDF 43 does not differ so much whether the average input power is −25 dBm or −5 dBm. As a result, the gain of the final-stage YbDF 43 at a wavelength of 1064 nm becomes 17 dB to 18 dB as shown in FIG. 10 and never exceeds 20 dB mentioned above. FIG. 10 shows a gain spectrum (G(−25)) where the input level is −25 dB, a gain spectrum (G(−20)) where the input level is −20 dB, a gain spectrum (G(−15)) where the input level is −15 dB, a gain spectrum (G(−10)) where the input level is −10 dB, and a gain spectrum (G(−5)) where the input level is −5 dB. FIG. 10 also shows a gain spectrum at the time of an abnormal operation (in a state where the pumping light source is deteriorated) and a gain spectrum in this embodiment.

The foregoing relates to only the normal operation. When at least one of the pumping light sources 82, 83 deteriorates so that the output power of the pumping light sources 82, 83 lowers to 100 mW, for example, the gain at the wavelength of 1064 nm exceeds 30 dB as shown in FIG. 10. As a result, there is a risk of mode-competed oscillations occurring near the wavelength of 1064 nm, thereby destroying optical components such as pumping light sources.

For preventing this worst state from happening, it is desirable that both ends of the final-stage YbDF 43 be provided with the optical fiber Bragg grating 60 and reflecting film 123 as reflecting means having a reflectance of 22 dB at the wavelength of 1040 nm. In particular, the reflective film 123 as the reflecting means on the output side has a high possibility of being damaged, and thus is desirably inserted as a spatial component after widening the beam diameter. Such a control scheme that renders an upper limit to the gain by reflecting means for reflecting a specific wavelength of light may also be applied to the most upstream YbDF 41.

Second Embodiment

Figure 11:
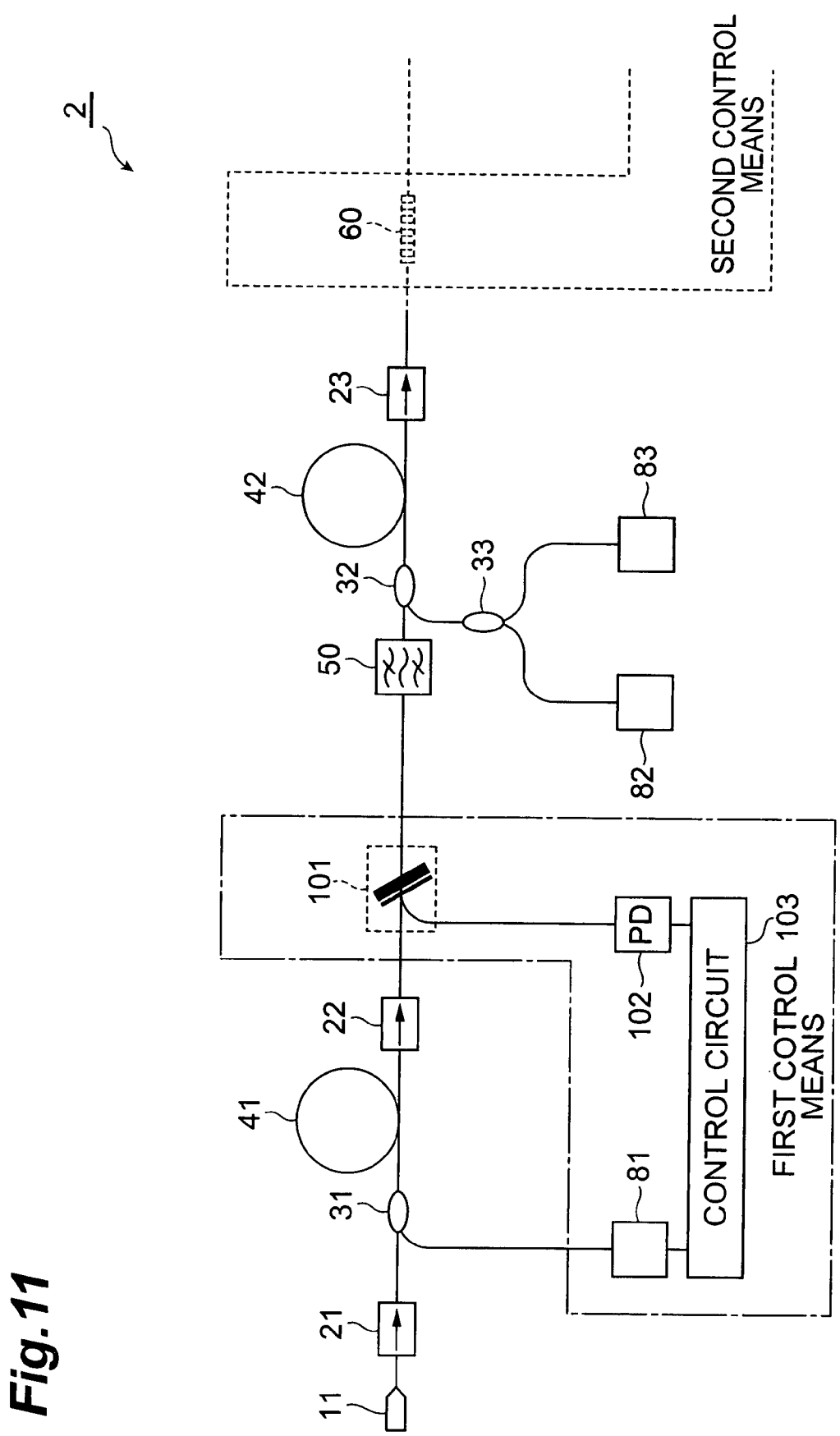
FIG. 11 is a diagram showing the structure of a main part in a second embodiment of the optical fiber amplifying module according to the present invention.

FIG. 11 is a diagram showing the structure of a main part in a second embodiment of the optical fiber amplifying module according to the present invention. The basic structure of the optical fiber amplifying module 2 according to the second embodiment is the same as that of the above-mentioned optical fiber amplifying module 1 according to the first embodiment. However, the second embodiment differs from the first embodiment in that it further comprises a first control means feedback structure. FIG. 11 does not depict the structure on the downstream side of the bandpass filter 50, since it is the same as that in the optical fiber amplifying module 1 according to the first embodiment.

As mentioned above, it is desirable that the gain from the input connector 11 to the optical isolator 22 be not higher than about 15 dB. However, the input and output of light to be amplified having a low duty cycle are hard to monitor accurately. Therefore, the optical fiber amplifying module 2 according to the second embodiment comprises an optical filter 101 which is arranged between the optical isolator 22 and bandpass filter 50 and selectively reflects only a specific wavelength component in the ASE light generated in the YbDF 41, a light-receiving device (PD) 102 which receives the specific wavelength component reflected by the optical filter 101, and a control circuit 103 which controls the pumping light power outputted from the pumping light source 81 as shown in FIG. 11. The optical filter 101, light-receiving device 102, control circuit 103, and pumping light source 81 construct the first control means.

In the control circuit 103 in the second embodiment, the specific wavelength component reflected by the optical filter 101 is monitored by the light-receiving device 102. When the monitored value obtained from the light-receiving device 102 exceeds a preset value, the control circuit 103 performs feedback control according to the excess amount such as to lower the current supplied to the pumping light source. Here, the specific wavelength component to be monitored is suitably about 1040 nm where an ASE light peak exists as shown in FIG. 10. This is because that it is sensitive to changes in the gain of the YbDF 41 and that the absolute value of its gain is large (easy to detect).

As in the foregoing, the optical fiber amplifying module according to the second embodiment can easily secure a gain without monitoring signal light (light to be amplified) having a low duty cycle, and can effectively protect the bandpass filter 50.

Third Embodiment

Figure 12:
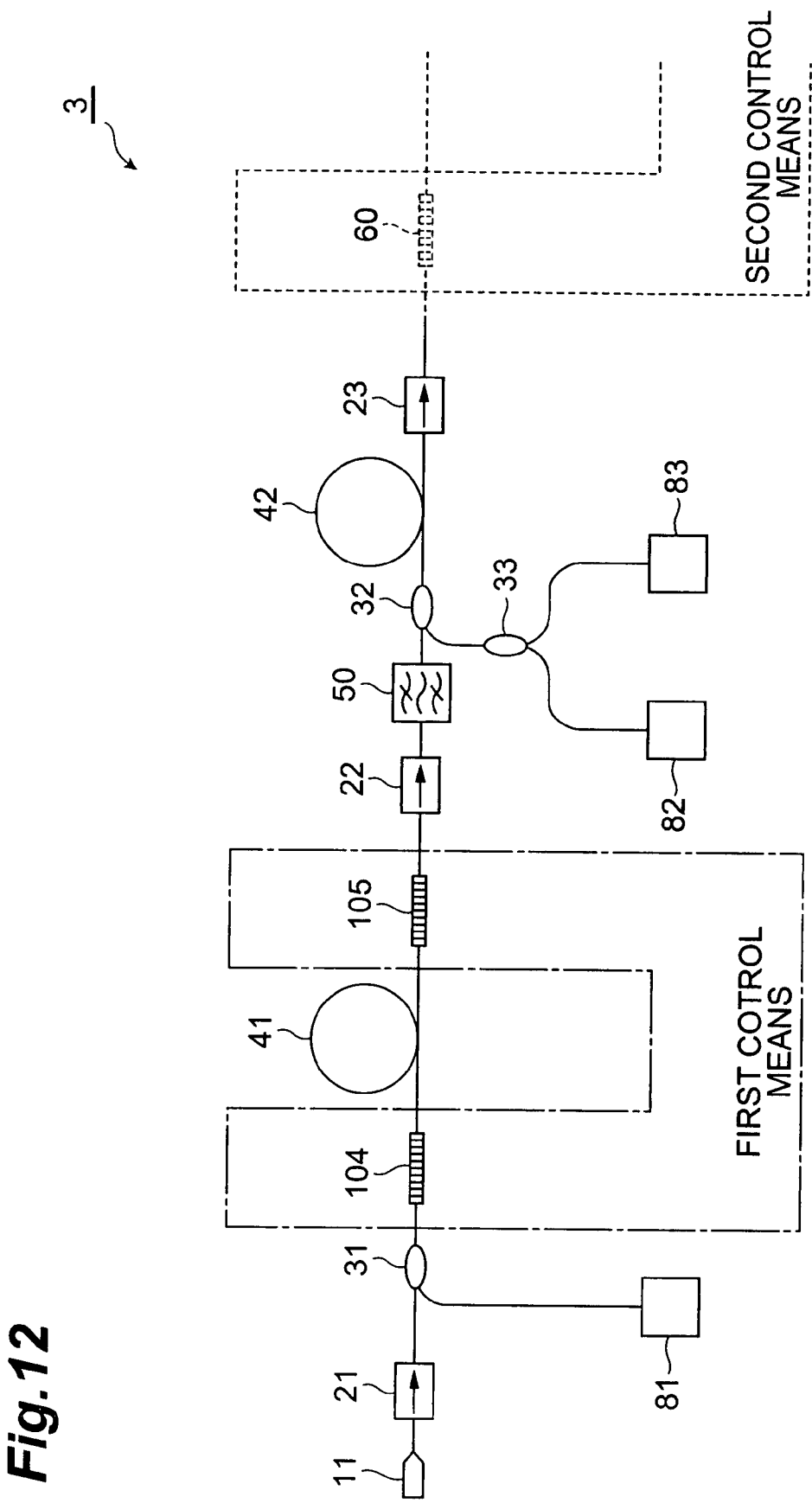
FIG. 12 is a diagram showing the structure of a main part in a third embodiment of the optical fiber amplifying module according to the present invention.

FIG. 12 is a diagram showing the structure of a main part in a third embodiment of the optical fiber amplifying module according to the present invention. The basic structure of the optical fiber amplifying module 3 according to the third embodiment is also the same as that of the above-mentioned optical fiber amplifying module 1 according to the first embodiment. However, the first control means in the third embodiment differs from that in the above-mentioned first and second embodiments in that it comprises a structure which makes it possible to protect the pumping light source 81 without monitoring the signal light (light to be amplified) having a low duty cycle. As with FIG. 11, FIG. 12 does not depict the structure on the downstream side of the bandpass filter 50, which is the same as that in the optical fiber amplifying module 1 according to the first embodiment.

In the optical fiber amplifying module 2 according to the third embodiment, as shown in FIG. 12, the first control means is constructed by optical fiber Bragg gratings 104, 105 arranged on both ends of the YbDF 41, while the optical fiber Bragg gratings 104, 105 constitute a resonator.

The reflectance of the optical fiber Bragg gratings 104, 105 is set such that an oscillation starts when the gain from the input connector 11 to the optical isolator 22 exceeds about 15 dB. Preferably, the center reflection wavelength of each of the optical fiber Bragg gratings 104, 105 is set near 1040 nm.

As in the foregoing, the present invention can stably attain a high gain even when amplifying light (light to be amplified) having a low duty cycle.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber amplifying module stably attaining a high gain even when amplifying light having a duty cycle of 1% or less, the optical fiber amplifying module comprising:
   an input end being configured to receive light to be amplified as input light;
   an output end being configured to output amplified light obtained by amplifying the input light acquired through the input end;
   a plurality of amplification optical fibers, cascaded along a light propagation path extending from said input end to said output end, each amplifying the input light;
   a dielectric multilayer film optical filter having such characteristics that selectively transmit therethrough the input light acquired through said input end but block other wavelength components excluding the input light, said dielectric multilayer film optical filter being provided between a first-stage amplification optical fiber initially transmitting therethrough the input light transmitted through said input end and a second-stage amplification optical fiber initially transmitting therethrough the amplified light outputted from said first-stage amplification optical fiber, of said plurality of amplification optical fibers;
   an optical isolator having such characteristics that transmit the light propagating from said first-stage amplification optical fiber to said second-stage amplification optical fiber, said optical isolator being provided between said first-stage amplification optical fiber and said second-stage amplification optical fiber;
   first control means for setting a gain for the input light in said first-stage amplification optical fiber to a first predetermined value or lower, the first predetermined value being set such that light to be inputted to said dielectric multilayer film optical filter does not destroy said dielectric multilayer film optical filter; and
   second control means for setting a gain for the input light in a final-stage amplification optical fiber arranged closest to said output end in said plurality of amplification optical fibers to a second predetermined value or less,
   wherein said first and second control means set such that the second predetermined value becomes smaller than the first predetermined value, respectively.

2. An optical fiber amplifying module according to claim 1, wherein said second control means includes two reflecting means, arranged so as to hold said final-stage amplification optical fiber therebetween, for transmitting the input light therethrough and selectively reflecting a specific wavelength component near the input light.

3. An optical fiber amplifying module according to claim 2, wherein said reflecting means positioned on the downstream side as seen in the propagating direction of input light in said two reflecting means is arranged in a space where the amplified light outputted from said final-stage amplification optical fiber propagates between said final-stage amplification optical fiber and said output end.

4. An optical fiber amplifying module according to claim 2, wherein the specific wavelength component selectively reflected is a wavelength shorter than any of wavelength components included in the input light.

5. An optical fiber amplifying module stably attaining a high gain even when amplifying light having a duty cycle of 1% or less, the optical fiber amplifying module comprising:
   an input end being configured to receive light to be amplified as input light;
   an output end being configured to output amplified light obtained by amplifying the input light acquired through the input end;
   a plurality of amplification optical fibers, cascaded along a light propagation path extending from said input end to said output end, each amplifying the input light;
   a dielectric multilayer film optical filter having such characteristics that selectively transmit therethrough the input light acquired through said input end but block other wavelength components excluding the input light, said dielectric multilayer film optical filter being provided between a first-stage amplification optical fiber initially transmitting therethrough the input light transmitted through said input end and a second-stage amplification optical fiber initially transmitting therethrough the amplified light outputted from said first-stage amplification optical fiber, of said plurality of amplification optical fibers;
   an optical isolator having such characteristics that transmit the light propagating from said first-stage amplification optical fiber to said second-stage amplification optical fiber, said optical isolator being provided between said first-stage amplification optical fiber and said second-stage amplification optical fiber; and
   first control means for setting a gain for the input light in said first-stage amplification optical fiber to a first predetermined value or lower, the first predetermined value being set such that light to be inputted to said dielectric multilayer film optical filter does not destroy said dielectric multilayer film optical filter,
   wherein said second-stage amplification optical fiber has a length longer than that of said first-stage amplification optical fiber, said second-stage amplification optical fiber being a Yb-doped optical fiber to be cladding-pumped.

6. An optical fiber amplifying module stably attaining a high gain even when amplifying light having a duty cycle of 1% or less, the optical fiber amplifying module comprising:
   an input end being configured to receive light to be amplified as input light;
   an output end being configured to output amplified light obtained by amplifying the input light acquired through the input end;
   a plurality of amplification optical fibers, cascaded along a light propagation path extending from said input end to said output end, each amplifying the input light;

a dielectric multilayer film optical filter having such characteristics that selectively transmit therethrough the input light acquired through said input end but block other wavelength components excluding the input light, said dielectric multilayer film optical filter being provided between a first-stage amplification optical fiber initially transmitting therethrough the input light transmitted through said input end and a second-stage amplification optical fiber initially transmitting therethrough the amplified light outputted from said first-stage amplification optical fiber, of said plurality of amplification optical fibers;

an optical isolator having such characteristics that transmit the light propagating from said first-stage amplification optical fiber to said second-stage amplification optical fiber, said optical isolator being provided between said first-stage amplification optical fiber and said second-stage amplification optical fiber; and first control means for setting a gain for the input light in said first-stage amplification optical fiber to a first predetermined value or lower, the first predetermined value being set such that light to be inputted to said dielectric multilayer film optical filter does not destroy said dielectric multilayer film optical filter, wherein a final-stage amplification optical fiber arranged closest to said output end in said plurality of amplification optical fibers has an unsaturated absorption peak smaller than that of said first-stage amplification optical fiber, said second-stage amplification optical fiber being a Yb-doped optical fiber to be cladding-pumped.

7. An optical fiber amplifying module according to claim 1, wherein said first-stage amplification optical fiber is set in a temperature-controlled environment, said first-stage amplification optical fiber having an unsaturated absorption set to a specific value in the temperature-controlled environment, and wherein said first control means controls a pumping light source supplying pumping light to said first-stage amplification optical fiber such that the pumping light keeps a constant power.

8. An optical fiber amplifying module according to claim 5, wherein said first-stage amplification optical fiber is set in a temperature-controlled environment, said first-stage amplification optical fiber having an unsaturated absorption set to a specific value in the temperature-controlled environment, and wherein said first control means controls a pumping light source supplying pumping light to said first-stage amplification optical fiber such that the pumping light keeps a constant power.

9. An optical fiber amplifying module according to claim 6, wherein said first-stage amplification optical fiber is set in a temperature-controlled environment, said first-stage amplification optical fiber having an unsaturated absorption set to a specific value in the temperature-controlled environment, and wherein said first control means controls a pumping light source supplying pumping light to said first-stage amplification optical fiber such that the pumping light keeps a constant power.

10. An optical fiber amplifying module stably attaining a high gain even when amplifying light having a duty cycle of 1% or less, the optical fiber amplifying module comprising:

an input end being configured to receive light to be amplified as input light;

an output end being configured to output amplified light obtained by amplifying the input light acquired through the input end;

a plurality of amplification optical fibers, cascaded along a light propagation path extending from said input end to said output end, each amplifying the input light and being doped with elementary Yb;

a dielectric multilayer film optical filter having such characteristics that selectively transmit therethrough the input light acquired through said input end but block other wavelength components excluding the input light said dielectric multilayer film optical filter being provided between a first-stage amplification optical fiber initially transmitting therethrough the input light transmitted through said input end and a second-stage amplification optical fiber initially transmitting therethrough the amplified light outputted from said first-stage amplification optical fiber in the plurality of amplification optical fibers, said second-stage amplification optical fiber being cladding-pumped; and an optical isolator having such characteristics that transmit the light propagating from said first-stage amplification optical fiber to said second-stage amplification optical fiber, said optical isolator being provided between said first-stage amplification optical fiber and said second-stage amplification optical fiber, wherein said first-stage amplification optical fiber has an unsaturated absorption of 1000 dB or less for the light propagating through said first-stage amplification optical fiber, and wherein a final-stage amplification optical fiber arranged closest to said output end in said plurality of amplification optical fibers has an unsaturated absorption peak smaller than that of said first-stage amplification optical fiber, said second-stage amplification optical fiber being a Yb-doped optical fiber to be cladding-pumped.

* * * * *